United States Patent
Iu et al.

(10) Patent No.: US 6,901,514 B1
(45) Date of Patent: May 31, 2005

(54) SECURE OBLIVIOUS WATERMARKING USING KEY-DEPENDENT MAPPING FUNCTIONS

(75) Inventors: Siu-Leong Iu, San Jose, CA (US); Wai Chu, Fremont, CA (US)

(73) Assignee: Digital Video Express, L.P., Richmond, VA (US)

( * ) Notice: Subject to any disclaimer, the term of this patent is extended or adjusted under 35 U.S.C. 154(b) by 990 days.

(21) Appl. No.: 09/583,903

(22) Filed: Jun. 1, 2000

Related U.S. Application Data

(60) Provisional application No. 60/136,961, filed on Jun. 1, 1999.

(51) Int. Cl.[7] .............................. H04L 9/00; H04K 1/02
(52) U.S. Cl. ........................ 713/176; 380/252; 380/254
(58) Field of Search ................................. 713/176, 200; 380/200–201, 252–254, 210, 287, 51, 54; 382/100, 135, 250–251, 232, 280; 705/50, 57, 59, 405

(56) References Cited

U.S. PATENT DOCUMENTS

| | | | | |
|---|---|---|---|---|
| 5,905,800 A | * | 5/1999 | Moskowitz et al. | 380/28 |
| 5,949,885 A | * | 9/1999 | Leighton | 380/54 |
| 6,373,974 B2 | * | 4/2002 | Zeng | 382/135 |

* cited by examiner

*Primary Examiner*—Hosuk Song
(74) *Attorney, Agent, or Firm*—David G Grossman

(57) ABSTRACT

A method for embedding a watermark into content is disclosed. The content contains content samples. The method including the steps of: receiving the content, creating a continuous watermark sequence from the watermark, and for each content sample in a first predetermined order: calculating a sample mean, calculating a sample variance, and normalizing the content. Further steps include generating a set of content coefficients from the content, generating a set of watermark coefficients from the watermark sequence, embedding the watermark in the content by adjusting the amplitude of the watermark coefficients so that the distortion between the content coefficients and the associated watermark coefficients are minimized using a secret mapping function, and outputting the content. The mapping functions may be controlled by a key-dependent random sequence to protect the watermarks.

23 Claims, 9 Drawing Sheets

SECURE OBLIVIOUS WATERMARKING USING KEY-DEPENDENT MAPPING FUNCTIONS

CROSS-REFERENCE TO RELATED APPLICATION

The present application claims the benefit of provisional patent application Ser. No. 60/136,961 to Iu et al., filed on Jun. 1, 1999, entitled "Secure Oblivious Watermarking using Key-Dependent Mapping Functions", which is hereby incorporated by reference.

TECHNICAL FIELD

This invention relates generally to data protection, and more particularly to aspects of a novel digital watermark system and methodology for multimedia content, such as audio, video, text, still images, computer graphics, and software.

BACKGROUND ART

A watermark is an imperceptible or at least difficult to perceive signal embedded into multimedia content such as audio, video, text, still images, computer graphics, or software. The watermark conveys some useful information without disturbing or degrading the presentation of the content in a way that is noticeable or objectionable. Watermarking techniques play an important role in protecting copyright ownership of digital contents including images, audio, and video. Watermarks may be used to identify the original owner of the content, to trace where pirate copies of the content come from (fingerprinting), and to determine royalty payments by monitoring the number of times content has been used. Watermarks may also be used to authenticate original content and to locate change in a corrupted or altered copy of the content. In order to encourage copyright owners to use watermarking schemes, four basic and conflicting requirements should be met. Firstly, the distortion introduced by embedding the watermarks into content should be unperceivable by regular users. Secondly, the watermarks should be secure so that they are hard to be modified or removed by the pirates. Thirdly, the watermarks should be robust against intentional attacks, ranging from simple content manipulation such as cropping, to common image processing techniques, such as filtering and compression. Lastly, the overall cost of using watermarking should not be expensive.

Watermarking schemes may be categorized as non-oblivious or oblivious, depending on whether the original content is available or not. Oblivious watermarking may be defined as a watermarking scheme in which the original image is not available during watermarking decoding. Non-oblivious image watermarking schemes in general may be more robust due to the accessibility of the original image because image distortions caused by image processing, transmission, or intentional attacks may be compensated for using the original image. Also, the interference between the original image and the watermarks during watermark decoding may be removed by using the difference of the watermarked and original images. However, for many applications, such as copy and playback control, and copyright protection, the requirement of accessing the original image is simply not practical. This may make oblivious watermarking the only choice. Watermarks may be embedded in the pixel or the transform domains. Two papers which discuss and compare different methodologies and watermarking schemes include "A fair benchmark for image watermarking systems", by M. Kutter and F. A. P. Petitcolas, (SPIE Electronic Imaging'99: Security and Watermarking of Multimedia Contents, vol. 3657, January 1999), and "Comparing robustness of watermarking techniques" by J. Fridrich and M. Goljan (SPIE Electronic Imaging'99: Security and Watermarking of Multimedia Contents, vol. 3657, January 1999). Proposed transforms include DCT, DFT, LOT, wavelets, Hadamard transform and key-dependent transforms. The watermark signal in a transform domain may usually be related to that in the pixel domain by a linear transformation, if the transform itself is linear. However, the analysis may be applied to pixel-based approaches as well. Human visual models have been used to adjust watermark strength so that embedded watermarks may be invisible. Spread-spectrum techniques are widely used by most oblivious watermarking approaches. When extracting the watermark message, these methods may rely on the watermark information embedded in the middle frequencies, although the noise-like watermark signal may also be embedded in the low and the high frequencies. The watermark information in the high frequencies may be easily removed using low-pass filtering and JPEG compression, and humans may be able to tolerate high distortion there. For low frequencies, watermark signals may have a high interference with the image itself. Note that the energy of a typical image may be concentrated in the lower frequencies.

For non-oblivious watermarking, adding watermarks in the low frequencies has been shown to have some advantages in a paper entitled "A review of watermarking and the importance of perceptual modeling", by I. Cox and M. Miller, Proc. of the SPIE Human Vision and Electronic Imaging, vol. 3016, pp. 92–99, February 1997. More watermark messages may be sent while the noise level of the image does not increase. Watermarks in the low frequencies in general may be more robust than that in the middle frequencies, with respect to image distortions that have low-pass characteristics, such as filtering. Examples of non-linear filtering, may include median filting, lossy compression filtering, and adaptive Wiener filtering. Watermarks in the low frequencies may also be less sensitive to small geometric distortions (e.g., rotation, shifting, and scaling). Therefore, seeking oblivious watermark schemes unitizing the low frequencies and distortion compensation techniques without the original image have become two active research topics.

Several watermark attack and counterattack methods have been proposed. To overcome a geometric attack, small blocks of a corrupted image may be registered with an original pseudo noise signal using correlation matching. Watermarks may also be removed by capturing watermark information pixel by pixel with a sensitivity attack if a pirate has access to a device that can detect whether the content contains a watermark or not.

To handle distortions without the original image, a calibration pattern may be embedded into the Fourier transform in the log-polar coordinates, so that the shift, scaling, s and rotation of the image may be compensated.

Some oblivious watermarking approaches using the low frequency bands have been proposed including embedding watermark information by swapping selected transform coefficients of 8×8 DCT blocks. The robustness of this type of approach may not be high and visible distortions may be introduced.

Another approach includes embedding watermark message bits into disjoint triplets of wavelet coefficients, which may be chosen according to a key-dependent random sequence. The middle coefficient may be quantized by a quantization step, what is equal to the difference of the largest and the smallest values of the triplet, divided by a fixed scale factor. This approach may not be applied to DCT coefficients since the standard deviation of the DCT coefficients in low frequencies may typically be very high. This requires a large fixed scale factor, or equivalently a small quantization step, in order for the watermark to remain invisible. Therefore, the robustness has to be compromised. Similar quantization techniques have been proposed to embed a cartoon or map image into a host image.

Quantization with frequency and spatial masking to embed watermarks into DCT 20 coefficients of 8×8 blocks has also been proposed. Watermarks using a small block size may not survive the distortions introduced by filtering with a large kernel. The suggested frequency masking model also becomes inaccurate for blocks larger than 16×16.

Yet another proposed method includes using the quantization index modulation to embed a watermark message into a host image. Message bits are used to select the pre-defined quantizers. Theoretical results for some channel models have been discussed. However, no experiments on real distortions have been reported.

Watermarks inserted in the middle and high frequencies may typically be very robust with respect to noise adding, nonlinear deformations of the gray scale, (e.g., contrast/brightness adjustment, gamma correction, histogram equalization), and cropping. Since these advantages are complementary to that of low-frequency techniques, and watermarks of low and middle frequencies are embedded into disjoint portions of the spectrum, Fridrich proposed to embed both low and high frequency watermarks into the image. To decode the hidden message in the low frequencies without the original image, binary mapping may be used. A (watermark) mapping function (also called an index function) may relate the watermarked transform coefficient to the watermark itself. Although it has been shown that the watermarks may be very robust to different types of distortion, there may be a serious security problem. The watermarks may be easily removed by clustering the DCT coefficients using a histogram attack, which may search for the parameters of the mapping function. If the intensity of some of the original pixels are guessed and if the basis function is known, then the watermarks may be estimated and the general watermark system fails. To overcome the histogram and the watermark-estimation attacks, it has been proposed that some secret key-dependent basis functions could be used. Although this scheme seems to be able to achieve better robustness to different distortions and high security to attacks, it may require very high computation and a relatively large amount of storage to generate the basis functions and to find the corresponding transform coefficients.

We will now discuss briefly an oblivious watermark approach, described in a paper by J. Fridrich, entitled "Combining low-frequency and spread spectrum watermarking", Proc. SPIE Int. Symp. on Optical Science, Engineering Instrumentation, San Diego, July 1998, which uses a binary mapping function. A security problem will be disclosed using a histogram attack.

The oblivious low frequency watermarking of Fridrich is described as follows. Let $f_o(p_j)$ be the intensity of an image at a j-th pixel $p_j=[x_j, y_j]^T, j \in \tilde{J}$, where $\tilde{J}=\{j|j=0,1,\ldots,n_p-1\}$ consisting of the index of all $n_p$ pixels in a raster scan order. FIG. 9A shows some raster scan orders that may be used. The present invention may be practiced with any scan order, several of which are shown in FIGS. 9A, 9B, 9C, and 9D. Let $m(f_o)$ and $\sigma^2(f_o)$ be the sample mean and variance of $f_o$. The image may be normalized by the following transform so that its sample mean becomes zero and its coefficients of discrete cosine transform (DCT) may fall into a pre-specified range.

$$f(p_j) = \frac{1024}{\sqrt{n_p}} \frac{f_o(p_i) - m(f_o)}{\sigma(f_o)} \qquad (1)$$

Denoting the original and watermarked DCT coefficients off as $v_i$ and $v_i'$, let $i \in \tilde{I}$ where $\tilde{I}=\{i|i=0,1,\ldots,n_w-1\}$ consists of the index of DCT coefficients in a zig-zag order. Then a binary watermark sequence $w_i, \in \tilde{I}$, $w_i \in \{-1, 1\}$ may be embedded to f by adjusting the amplitude of $v_i'$, so that the distortion between $v_i$ and $v_i'$ is minimum and $$w_i = M_0(|v_i'|) \qquad (2)$$

where the mapping function $$M_0(v') = (-1)^l \text{ if } v' \in I_{1l} = [a^l, a^{l+1}), a = \frac{1+\alpha}{1-\alpha} > 1, \alpha > 0 \qquad (3)$$

If $v_i < 1$, $v_i' = v_i$. The above mapping function is called an index function. It can be shown that the maximum difference between $v_i$ and $v_i'$ is less than $|v_i|\alpha$. In order to maximize the robustness with respect to image distortions, $v_i'$ is chosen to be the middle point of interval $I_{1l}$. To survive some common lossy compression and low-pass filtering, the watermarks may be embedded in the perceptually significant frequency bands with high energy, and the amount of change of different transform coefficients may be proportional to the amplitude of the coefficient itself. The watermark encoding and decoding may be simplified if they are performed in a log-magnitude domain. Let $u_i = \ln|v_i|$, $u_i' = \ln|v_i'|$ and $\beta = \ln \alpha$. The 1-th interval in the log domain may be denoted by $I_{21}=[l\beta, (l+1)\beta)$. The index of the interval where u is located may be determined by a locating function $$l(u) = \left\lfloor \frac{u}{\beta} \right\rfloor.$$

The watermark may be generated by the following mapping function $$w_i = M_1(u_i') \qquad (4)$$
$$= (-1)^{l_1(u_i')}$$

and assign $u_i' = q(u_i)$, where $q(u_i) = (l(u_i) + 0.5)\beta$ is the quantization function. More specifically, if $(-1)^{l(u_i)} = w_i$, then $u_i' = q(u_i)$. Otherwise, $u_i'$ may be equal to either $q(u_i) + \beta$, or $q(u_i) - \beta$, depending on which is closer to $u_i$.

During watermark decoding, the watermark may be estimated from the received DCT coefficient $u_i''$ as $\hat{w}_i = M_1(u_i'')$, where $$u_i'' = u_i' + n_i \qquad (5)$$

and $n_i$ is the noise. Then the watermark sequence may be determined by using the following correlation function $$\text{corr} = \max_{s \in (1-\Delta_\beta, 1+\Delta_\beta)} \frac{\sum_{i \in I} |v'_i|^\gamma \hat{w}_i (s \quad v'_i) w_i}{\sum_{i \in I} |v'_i|^\gamma} \quad (6)$$

where the scale factor s may be used to compensate the change of variance due to image distortions, and the weighting factor $\gamma$ may be used to reduce the effect of small coefficients. The values $\Delta_s = \frac{1}{4}$ and $\gamma=1$ will be used in the disclosure of the present invention.

Combining with mid-frequency watermarking using the spread spectrum technique, the above binary watermarking has been shown by Fredrich to be robust for many attacks. However there arises a serious security problem. Since the watermarked coefficients $u_i'$ are always located in the middle of the quantization intervals with a fixed size, a pirate may search for the correct quantization step using a histogram attack. Once the quantization step is found, the watermarks may be modified or removed. The histogram may be formed from the quantized DCT coefficients with a guessed quantization step size. For the correct step size, a peak will be present in the middle of the quantization interval.

Fridrich has observed this problem. He also discussed the security problem faced under the watermark-estimation attack. If the original intensity of some pixels of a watermarked image can be guessed, then the watermarks may be estimated and removed by solving a system of linear equations. To address both security problems, Fredrich proposed the use of key-dependent basis functions. He also demonstrated that his approach was quite robust to common distortions. However, his approach requires a high computation to generate the transform functions and to perform the forward or inverse transforms. To provide an alternative, the present invention will disclose a new class of mapping functions, which may require only simple operations. These mapping functions may be controlled by a secret key. To combat the watermark-estimation attacks, some counterattacks will also be disclosed.

What is needed is a simple and effective scheme to enhance the security and robustness of a low-frequency watermarking scheme that protects the watermarks by using a secret (watermark) mapping function instead of a secret transform basis function. The scheme should also reduce the interference between the watermarks and the image itself by using a key-dependent quantization function. The scheme should also be generalized so that it may be applied to pixel-domain watermarking schemes. To combat the watermark-estimation attack, a simple counterattack is also needed that that the use of key-dependent basis functions isn't needed.

DISCLOSURE OF THE INVENTION

One advantage of the invention is that it that protects watermarks by using a secret (watermark) mapping function instead of a secret transform basis function.

Another advantage of this invention is that it reduces the interference between the watermarks and the image itself by using a key-dependent quantization function.

Yet a further advantage of this invention is that it is generalized so that it may be applied to pixel-domain watermarking schemes.

To achieve the foregoing and other advantages, in accordance with all of the invention as embodied and broadly described herein, a method for embedding a watermark into content. The content contains content samples. The method including the steps of: receiving the content, creating a continuous watermark sequence from the watermark, for each content sample in a first predetermined order: calculating a sample mean, calculating a sample variance, and normalizing the content. Further steps include generating a set of content coefficients from the content, generating a set of watermark coefficients from the watermark sequence, embedding the watermark in the content by adjusting the amplitude of the watermark coefficients so that the distortion between the content coefficients and the associated watermark coefficients are minimized using a secret mapping function, and outputting the content.

In yet a further aspect of the invention, a method for a method for embedding a watermark into content, wherein the step of embedding the watermark in the content is performed by adjusting the watermark coefficients sequentially in a second predetermined order.

In yet a further aspect of the invention, an apparatus for embedding a watermark data into content including: a content preprocessor, the content preprocessor further including: a mean calculator; and a variance calculator, a content coefficient generator for generating content coefficients from the preprocessed content; a watermark sequence generator for generating a watermark sequence from the watermark data; a watermark coefficient generator for generating watermark coefficients from the watermark sequence; and a watermark inserter for generating watermarked content. The watermark inserter may further include a key dependent sequencer; a secret mapping function device, the secret mapping function device receiving input from the key dependent sequencer; and a coefficient modifier for generating watermarked content by adjusting the amplitude of the watermark coefficients so that the distortion between the content coefficients and the associated watermark coefficients are minimized using the secret mapping function device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

BEST MODE FOR PRACTICING THE INVENTION

The present invention is a new method for watermarking content using a novel class of secure mapping watermarking functions using key-dependent mapping functions.

The binary watermarking scheme disclosed by Fredrich and discussed in the background section may be defeated by a histogram attack because the DCT coefficients may be clustered in the middle of the interval for the correct quantization step size $\beta$. The present invention overcomes this security problem by first replacing the binary watermark sequence by a continuous sequence and by using secret mapping functions for different DCT coefficients. Replacing the binary watermark sequence by a continues sequence may cause the DCT coefficients after quantization to spread out in the quantization interval, making the search for the original quantization step size $\beta$ difficult. Using secret mapping functions for different DCT coefficients may make the histogram attack impossible because the mapping functions may not be known and may be changed for different DCT coefficients.

In general, many functions may be used as the mapping functions. The functions may be generated by a program or retrieved from a look-up table. For the robustness concern to different distortions or attacks, it may be required that these functions are continuous or at least piecewise continuous. Otherwise, a small change of the DCT coefficients may introduce a big error in the estimated watermark. To make these mapping functions practically useful, it may be important that these functions may be rapidly computed or generated in real-time and/or they do not require a large space to store their values. The present invention may use mapping functions which preferably take a simple function form. Their parameters may be controlled by some key-dependent random sequences to offer security.

Assume that the watermark sequence $w_i$ is an uniformly distributed random sequence with zero mean and unit variance, i.e. $w_i \in [-\sqrt{3}, \sqrt{3}]$. One approach to embed this watermark sequence to the image is to generate the watermarked signal $u_i'$ so that $$u_i' = q(u_i) + \alpha_i w_i, \qquad (7)$$

and the closest $u_i'$ with respect to $u_i$ is selected. It means that if $u_i = q(u_i) + \alpha_i w_i$, then $u_i'$ may be equal to $u_i$, $u_i + \beta_i$ or $u_i - \beta_i$, depending on which is closest to $u_i$. For different DCT coefficients, the quantization step size may be controlled by a key-dependent sequence $\beta_i$. The sequence $\beta_i$ may be uniformly distributed in $S_\beta = [\beta_{oi} - \Delta_\beta, \beta_{oi} + \Delta_\beta]$. The watermark strength may be controlled by $\alpha_i$, which is preferably set to $$\alpha_i = \frac{\beta_i}{2\sqrt{3}},$$

in order to map a quantization interval to a full dynamic range of the watermark sequence. From (7), the new mapping function may be found as $$w_i = \frac{1}{\alpha_i}[u_i' - q(u_i')] \qquad (8)$$
$$= M_2(u_i').$$

Figure 8A:
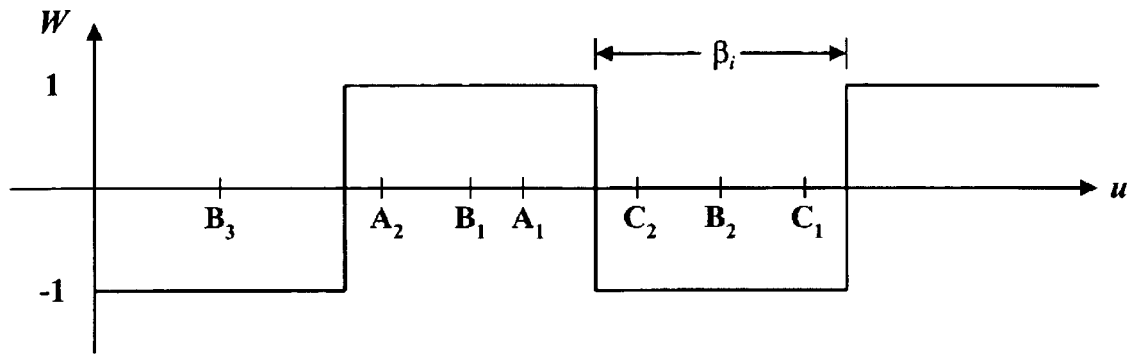
FIG. 8A is a diagram illustrating a square mapping function that may be used in practicing the present invention.
Figure 8B:
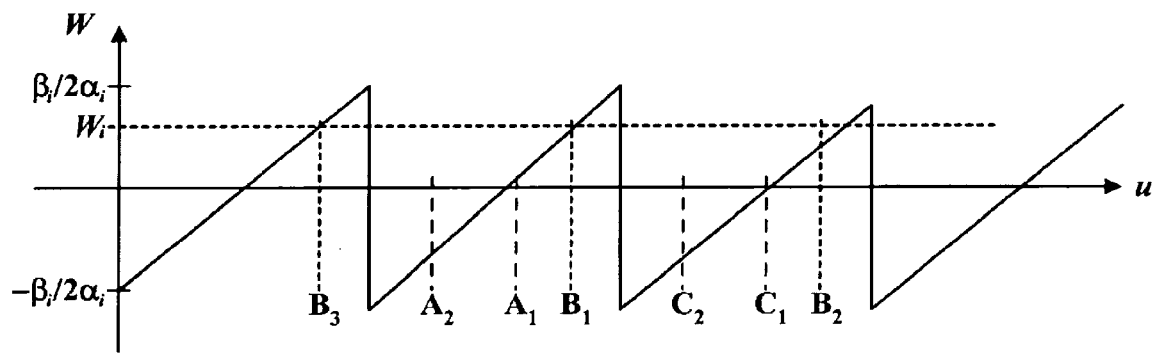
FIG. 8B is a diagram illustrating a saw tooth mapping function that may be used in practicing the present invention.

The above mapping function may be a sawtoothed function as shown in FIG. 8B. From (7), it may be shown that, the i-th DCT coefficient after watermarking may be related to the $v_i$ and $w_i$ by $$v_i' = v_i \exp(\alpha_i w_i) \exp(\Delta v) \qquad (9)$$

where $\Delta v = q(\ln|v'_i|) - \ln|v_i|$. The error $\Delta v$ may come from the quantization process.

From (5) and (7), it may be shown that $w_i = M_2(u_i'') + n'_i$, where $$n'_i = \frac{1}{\alpha_i}[q(u_i'') - q(u_i') - n_i].$$

If the noise $n_i$ is of low energy, $u_i''$ may fall into the same quantization interval as $u_i'$, i.e. $q(u_i'') = q(u_i')$. It implies that $w_i = M_2(u_i'') - n_i/\alpha_i$. Therefore, a good estimate of $w_i$ from $u_i''$ may be $$\hat{w}_{si} = M_2(u_i''). \qquad (10)$$

The watermark sequence may be determined by using the correlation in (6). Note that only $u_i''$ may be required to find this watermark estimate. It means that the original image may not be required to extract the watermark sequence. Since the mapping function $M_2(u)$ may be easy to compute, the computation requirement for watermark encoding and decoding may be relatively low.

Since the mapping function $M_2(u)$ is preferably controlled by the secret random sequence $\beta_i$ and each DCT coefficient may have a different quantization step size, it may be very difficult for a pirate to estimate the mapping functions for all DCT coefficients or the watermark sequence. Note that both values of the watermark sequence and the $\beta_i$ may be continuous, which mat make estimation even harder. The histogram of the quantized DCT coefficients for different $\beta$ may be quite random, demonstrating that the watermarks as well as the mapping functions may be protected under this attack.

One more layer of security may be offered via the design of the mapping function by allowing a varying size of the quantization intervals for quantizing the DCT coefficients, resulting in the interval length preferably varying for different i, i.e. $I_{3,l}=[\Sigma_{j=0}^{l}\beta_i(j), \Sigma_{j=0}^{l+1}\beta_i(j)]$ for the l-th interval. This may require more computation for watermark encoding, watermark decoding and generating more random sequences for $\beta_i(j)$.

For the saw-toothed mapping function, there may be a problem for the robustness of the watermark recovery. If the noise $n_i$ makes the received $u_i''$ fall out of the original quantization interval, a large error may be introduced. It may specially be the case at the borders of the quantization intervals, where an abrupt sign change may occur to the watermark estimate. To overcome this problem, a triangle mapping function is proposed. The basic idea is to eliminate the sharp changes in the saw-toothed function that causes the sign change of the adding watermark. The mapping function in equation10 therefore becomes $$w_i = (-1)^{l(u_i')}\frac{1}{\alpha_i}[u_i' - q(u_i')] \quad (11)$$
$$= M_3(u_i')$$

To insert watermark, adjust $u_i'$ so that $$u_i'=q(u_i')+(-1)^{l(u_i')}\alpha_i w_i \quad (12)$$

Figure 8C:
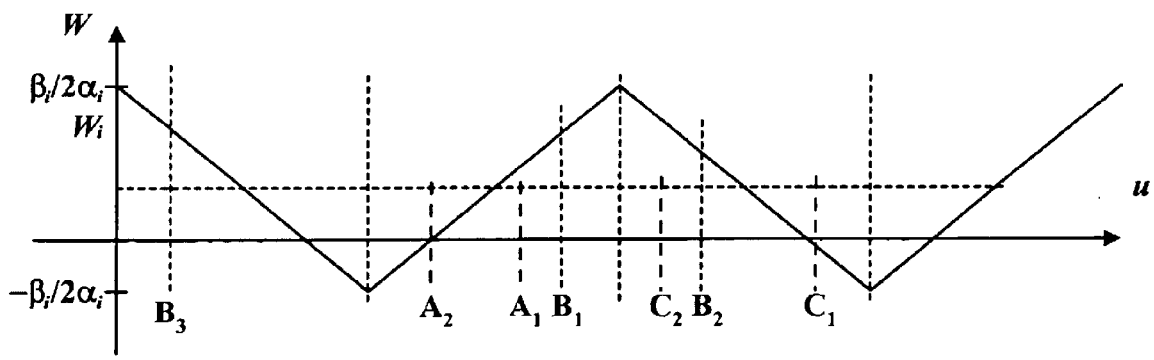
FIG. 8C is a diagram illustrating a trianglar mapping function that may be used in practicing the present invention.
Figure 9A:
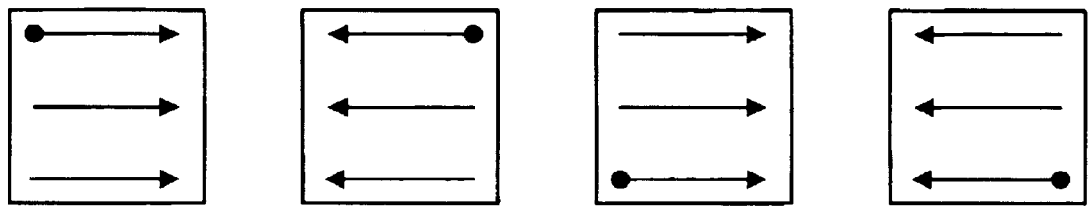
FIG. 9A is a diagram illustrating horizontal processing orders that may be used when practicing the present invention.
Figure 9B:
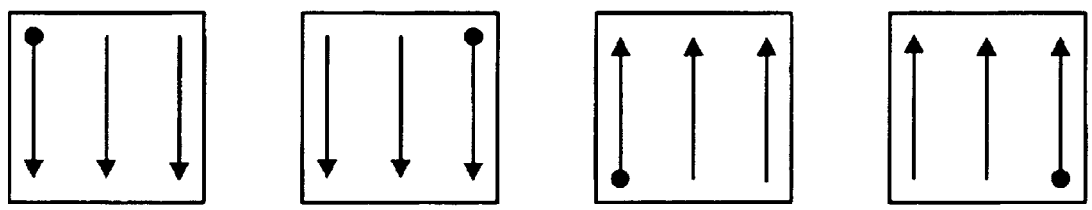
FIG. 9B is a diagram illustrating vertical processing orders that may be used when practicing the present invention.
Figure 9C:
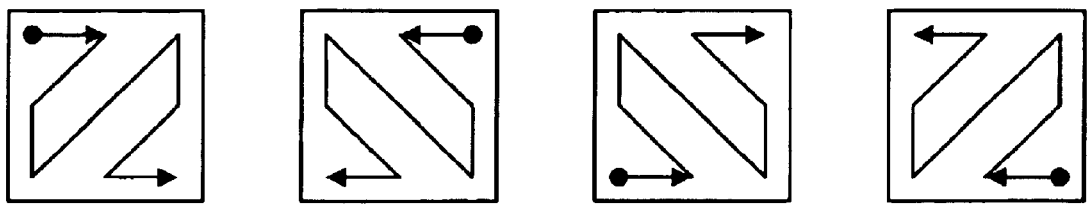
FIG. 9C is a diagram illustrating horizontal zig-zag processing orders that may be used when practicing the present invention.
Figure 9D:
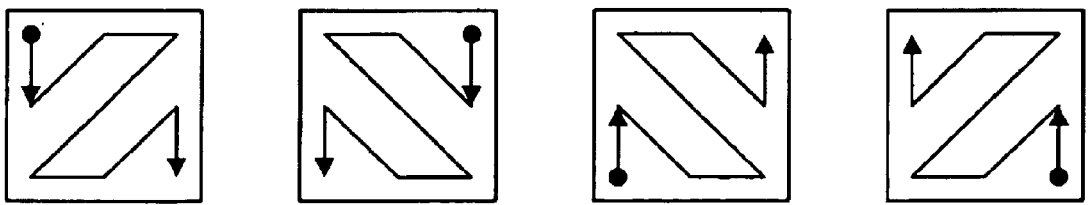
FIG. 9D is a diagram illustrating vertical zig-zag processing orders that may be used when practicing the present invention.

This may be achieved by simply assigning $q(u_i)+(-1)^{l(u_i')}\alpha_i w_i$ to $u_i'$. There is no need to find the closest $u_i'$ due to the characteristics of the mapping function. FIG. 8C shows the triangle mapping function $M_3(u)$. To improve further the overall stealth, the above watermark encoding and decoding may be modified as follows so that the final sign of the embedded watermark may be controlled by an additional key-dependent random sequence $s_i \in \{0, 1\}$.

$$w_i = (-1)^{l(u_i')+s_i}\frac{1}{\alpha_i}[u_i' - q(u_i')] \quad (13)$$
$$= M_4(u_i').$$

$$u_i' = q(u_i') + (-1)^{l(u_i')+s_i}\alpha_i w_i \quad (14)$$

Similar to the saw-toothed function, if the noise $n_i$ is not large, i.e. $q(u_i'')=q(u_i')$, then $w_i=M_4(u_i'')-n_i/\alpha_i$. A good estimate of $w_i$ from $u_i''$ without knowing the $u_i$ or $u_i'$ becomes $\hat{w}_{ti}=M_4(u_i'')$.

For the binary mapping function, its security problem may be overcome by using randomized quantization steps, i.e.

$$w_i = q(u_i') \text{ with key-dependent quantization step size } \beta_i \quad (15)$$
$$M_1'(u_i').$$

The watermark estimate of that becomes $\hat{w}_{bi}=M_1'(u_i'')$.

This scheme protects the watermarking system under histogram attack. Since each DCT coefficient has its own quantization step size, the attack which searches for a common step size would fail and the histogram will appear to be random. Histograms for the binary and saw-toothed mapping functions with a random sequence of $\beta_I$ may show no distinctive peak that can be identified and the resulting data display may show a randomized behavior.

For generalized mapping functions, periodic functions with key-dependent parameters may be used as follows $$w(u_i)=f(A_i, f_i, \theta_i, u_i) \quad (16)$$

Where $A_i$ may be the amplitude, $f_i$ may be the period, $\theta_I$ may be the phase. This leads to $$w_l(u_i) = \frac{1}{\alpha_i}[u_i' - q(u_i' - \theta_i)]$$

Hence $$u_i=q(u_i)+,\alpha_i w_l(u_l)+\theta_l]$$

Which leads to $$W_2(u)=A_i \cos(2\pi f_i(u_i)+\theta_i)$$

Rewatermarking may be accomplished with and without quantization, where the received watermark coefficients may be described by $$u_i'=u_i'+(-1)^{l(u_i')+sni}\alpha_i w_i$$

A truncated function may be used $$T_l(f_0) = \begin{array}{ll} l\beta & 0 \le x \le l\beta \\ x & l\beta \le x(l+1) \\ (l+1)\beta & x \ge (l+1)\beta \end{array}$$

$$u_i'=t1(u_i+(-1)^{l(u_i')+si}\alpha_i w_i$$

For the binary, saw-toothed, and triangle mapping functions in equations 4, 10, and 13, respectively, their distortions during watermark encoding and the watermark estimate error during watermark decoding are analyzed. Note that since these mapping functions are periodic, analyzing one period of each function is sufficient without loss of generality. Let $\Delta u_{bi}=u_i-u'_{bi}$, $\Delta u_{si}=u_i-u'_{si}$, $\Delta u_{ti}=u_i-u'_{ti}$, $\Delta w_{bi}=w_i-\hat{w}_{bi}$, $\Delta w_{si}=w_i-\hat{w}_{si}$, and $\Delta w_{ti}=w_i-\hat{w}_{ti}$. Denote regions according to the location index $l(u_i')$ as $R_a=\cup_k[(l(u_i')+2k)\beta_i, (l(u_i')+2k+1)\beta_i]$, $R_{b1}=\cup_k[(l(u_i')+2k+1)\beta_i, (l(u_i')+2k+1.5)\beta_i]$, $R_{b2}=\cup_k[(l(u_i')+2k+1.5)\beta_i, (l(u_i')+2k+2)\beta_i]$, and $R_b=R_{b1}\cup R_{b2}$. Note that the period of the mapping function is $2\beta_i$. Let $$n_i=2k\beta_i+n_{ti}, k=0, \pm 1, \pm 2, \ldots \quad (16)$$

where $n_{ti}\in(-0.5\beta_i-a_i w_i, 1.5\beta_i-a_i w_i)$.

For the binary mapping function, if the log-magnitude of the i-th DCT coefficient after watermarking, $u_i'$, may fall into the same interval as that of $u_i$, i.e. $q(u_i')=q(u_i)$, the watermark encoding error simply equals to the quantization error. It means that $|\Delta u_{bi}|=|u_i-q(u_i)|\in[0, \beta_i/2)$ because $u_i'=q(u_i')$. If $u_i'$ falls into the interval before or after the interval of $u_i$, i.e. $q(u_i')=q(u_i)\pm 1$, then $|\Delta u_{bi}|\in[\beta_i/2, \beta_i)$ (c.f.\FIG. 8A). Similarly, for the saw-toothed mapping function, if $q(u_i')=q(u_i)$, then the watermark encoding error equals to the quantization error and $|\Delta u_{si}|\in[0, \beta_i/2)$. Otherwise, $|\Delta u_{si}|\in(0, \beta_i/2]$. For the triangle mapping function, as mentioned before, $q(u_i')$ always equals to $q(u_i)$. Therefore, the watermark encoding error $|\Delta u_{ti}|)[0, \beta_i)$. Table 1 summarizes these results. As we can see, for the same $\beta_i$, the triangle mapping function may have a larger encoding error than that of the saw-toothed mapping function.

For the binary mapping function, if the received DCT coefficient $u_i''$ falls into $R_a$, the watermark $w_i$ can be decoded correctly, i.e. $\Delta w_{bi}=0$. Otherwise, the sign of $w_i$ maybe reversed which may lead to a decoding error of 2.

For the sawtoothed mapping function, from equation 10, we have $$\Delta w_{si} = w_i - \hat{w}_{si} \qquad (17)$$

$$= \frac{1}{\alpha_i}(q(u_i'') - q(u_i') - n_i)$$

$$= \frac{1}{\alpha_i}\left(\left\lfloor \frac{u_i' + 2k\beta_i + n_{li}}{\beta_i} \right\rfloor \beta_i - (2k\beta_i + n_{li})\right)$$

$$= \frac{1}{\alpha_i}\left(\left\lfloor \frac{u_i' + n_{li}}{\beta_i} \right\rfloor \beta_i - \left\lfloor \frac{u_i'}{\beta_i} \right\rfloor \beta_i - n_{li}\right)$$

If $u_i'' \epsilon R_a$, then $$\left\lfloor \frac{u_i' + n_{li}}{\beta_i} \right\rfloor \beta_i - \left\lfloor \frac{u_i'}{\beta_i} \right\rfloor \beta_i.$$

Therefore, $$\Delta w_{si} = -\frac{n_{li}}{\alpha_i} = -2\sqrt{3}\frac{n_{li}}{\beta_i}$$

since $$\alpha_i = \beta_i/(2\sqrt{3}).$$

If $u_i'' \epsilon R_b$ and $n_{li} \geq 0$, then $$\left\lfloor \frac{u_i' + n_{li}}{\beta_i} \right\rfloor \beta_i = \left\lfloor \frac{u_i'}{\beta_i} \right\rfloor \beta_i + \beta_i.$$

This may imply that $$\Delta w_{si} = \frac{\beta_i - n_{li}}{\alpha_i} = 2\sqrt{3}\left(1 - \frac{n_{li}}{\beta_i}\right).$$

Finally, if $u_i'' \epsilon R_b$ and $n_{li} < 0$, we have $$\left\lfloor \frac{u_i' + n_{li}}{\beta_i} \right\rfloor \beta_I = \left\lfloor \frac{u_i'}{\beta_i} \right\rfloor \beta_i - \beta_i.$$

In other words, $$\Delta w_{si} = \frac{-\beta_i - n_{li}}{\alpha_i} = -2\sqrt{3}\left(1 - \frac{|n_{li}|}{\beta_i}\right).$$

For the triangle mapping function, if $u_i'' \epsilon R_a$, i.e. $(-1)^{l(ui')} = (-1)^{l(ui'')}$, we have $$\Delta w_{ti} = w_i - M_3(u_i'') \qquad (18)$$

$$= (-1)^{l(ui')}\left(-\frac{n_{li}}{\alpha_i}\right)$$

$$= (-1)^{l(ui')}\left(-2\sqrt{3}\frac{n_{li}}{\beta_i}\right)$$

On the other hand, if $u_i' \epsilon R_b$, i.e. $(-1)^{l(ui'')} = (-1)^{l(ui')+1}$, then $$\Delta w_{ti} = (-1)^{l(ui')}\frac{1}{\alpha_i}[u_i' + u_i'' - q(u_i') - q(u_i'')] \qquad (19)$$

Since $\alpha w_i + n_{li} = \beta_i + (u_i'' - q(u_i''))$, $\Delta w_{ti}$ can be rewritten as $$\Delta w_{ti} = (-1)^{l(ui')}[2w_i + (n_{li} - \beta_i)/\alpha_i] \qquad (20)$$

$$= (-1)^{l(ui')}[2w_i + 2\sqrt{3}(n_{li}/\beta_i - 1)]$$

Table 2 summarizes these results.

Comparing the saw-toothed and the triangle mapping functions, when $u_i'' \epsilon R_a$, they may have the same watermark decoding error, i.e.

$$|\Delta w_{si}| = |\Delta w_{ti}| = 2\sqrt{3}\frac{|n_{li}|}{\beta_i}.$$

If $u_i'' \epsilon R_b$ and $$w_i \geq 0, |\Delta w_{si}| - |\Delta w_{ti}| = 2\left[\frac{\beta_i - n_{li}}{\alpha_i} - w_i\right].$$

This leads to two different cases. If $u_i'' \epsilon R_{b1}$; $\alpha_i w_i < \beta_i - n_{li}$, then we have $|\Delta w_{si}| > |\Delta w_{ti}|$. Similarly, if $u_i'' \epsilon R_{b2}$, $a_i w_i \geq \beta_i - n_{li}$, we find $|\Delta w_{si}| < |\Delta w_{ti}|$.

Similar results for other cases can be derived. The results are summarized in Table 3.

TABLE 1

Watermark encoding errors for binary, saw-toothed and triangle mapping functions.

| $Q(u_i')$ | $|\Delta u_{bi}|$ | $|\Delta u_{si}|$ | $|\Delta u_{ti}|$ |
|---|---|---|---|
| $q(u_i)$ | $[0, \beta_i/2)$ | $[0, \beta_i/2)$ | $[0, \beta_i)$ |
| $q(\beta_i) \pm 1$ | $[B_i/2, \beta_i)$ | $(0, \beta_i/2]$ | Not apply |

TABLE 2

Watermark decoding errors for binary, saw-toothed and triangle mapping functions.

| $u_i''$ | $|\Delta w_{bi}|$ | $|\Delta w_{si}|$ | $|\Delta w_{ti}|$ |
|---|---|---|---|
| $R_a$ | 0 | $2\sqrt{3}\frac{|n_{li}|}{\beta_i}$ | $2\sqrt{3}\frac{|n_{li}|}{\beta_i}$ |
| $R_b$ | 2 | $2\sqrt{3}\sim\left\|1 - \frac{|n_{li}|}{\beta_i}\right\|$ | $\left\|2\sqrt{3}\frac{|n_{li}|}{\beta_i}\right) - 2|w_i|\right\|$ |

TABLE 3

Comparisons of watermark decoding errors between saw-toothed and triangle mapping functions.

| $u_i''$ | $w_1 \geq 0$ | $w_i < 0$ |
|---|---|---|
| $R_a$ | $|\Delta w_{ti}| = |\Delta w_{si}|$ | $|\Delta w_{ti}| = |\Delta w_{si}|$ |
| $R_{b1}$ | $|\Delta w_{ti}| < |\Delta w_{si}|$ | $|\Delta w_{ti}| > |\Delta w_{si}|$ |
| $R_{b2}$ | $|\Delta w_{ti}| > |\Delta w_{si}|$ | $|\Delta w_{ti}| < |\Delta w_{si}|$ |

One type of attack to a watermark system is to estimate the unknown watermarks from a given watermarked image $f_o'$, by assuming that part of the original image $f_o$ may be guessed or closely approximated. This is called the watermark-estimation attack. For example, the intensity of a uniform region in the original image may be reasonably approximated by the sample mean of that region. Assume that the watermark sequence is embedded in some transform coefficients. For convenience, the original intensity of pixel $p_j$ may be represented by $f_o(p_j)=\Sigma_i v_i \Phi_i(p_j, w_i)$, where $v_i$ is the i-th transform coefficients of the corresponding basis function $\Phi_i(p_j, w_i)$, and $w_i=[w_{xi}, w_{yi}]^T$ denotes the frequency component of this 2-D transform. Note that a sequential order may always be imposed to the index of the frequency components of a 2-D transform, such as a zigzag order of DCT coefficients. FIGS. 9A, 9B, 9C, and 9D show examples of various orders that may be used.

Let $v_i'$ be the corresponding watermarked coefficients. The difference between the original and watermarked images at pixel $p_j$ may therefore be $$f_o(p_i) - f_o'(p_i) = \sum_{i \in \bar{d}} v_{di} \Phi_i(p_j, \omega_i) \quad (21)$$

where $v_{di}=v_i-v_i'$. Under the watermark-estimation attack, if a pirate guesses the original intensity of a sufficient number of pixels, the value of $v_{di}$ may be determined by solving the above linear system. If the watermarking scheme is not properly designed, the watermark sequence $w_i$ may be easily estimated. For example, one approach may be to embed the watermark sequence $w_i$ as $v_i=v_i(1+\alpha w_i)$,'. Given $v_i'$ and $v_{di}$, the watermark sequence may be found by $$\alpha w_i = \frac{v_i'}{v_i' + v_{di}}.$$

Key-dependent basis functions may be used to protect the watermarks. Since the basis functions may be kept secret, a pirate may not find the transform coefficients, neither $v_i'$ nor $v_{di}$. For key-dependent mapping functions as per the present invention, since the mapping functions are preferably unknown, the watermarks may not be determined even if the pirate knows the transform function. As a result, both Fridrich's and our approach may keep the watermarks secure, while our approach requires much lower computations.

Another counterattack to offend the watermark-estimation attack may be to add some noise to the image to corrupt quality of the estimation of $v_{di}$. The added noise may make the estimation of watermarks for this attack unusable. However, if the intention of the pirate is to remove the watermarks instead of extracting it, the above watermark-estimation attack may causes a serious problem. If $v_i'$ and $v_{di}$ are available, then $v_i$ may be directly computed from $v_i=v_i'+v_{di}$. As a result, the watermark information may be removed completely by replacing $v_i'$ of the watermark image by $v_i$. This problem may not be overcome by either our proposed mapping functions, nor adding noise to the watermark image. The approach of using the key-dependent basis functions may also fail. A pirate may select some well-known basis functions and estimate $v_i$ with respect to these basis functions. Such a replaced $v_i$ may still be used to remove the watermarks that are embedded in the transform coefficients with respect to the unknown key-dependent basis functions. The reason for that is the representation of the original image with respect to the basis functions may be unique, and the transform coefficients using two different basis functions may be related by a linear or non-linear transformation.

Fortunately, there is a simple solution for solving this problem. For the pixels whose intensity may be estimated easily, after watermarking, the pixels in the watermarked image may be replaced by the pixels in the original image. In this case, $V_{di}$ may not be estimated because the left hand side of (23) may be equal to zero. The new transform coefficients of the new watermarked image with this replacement should be quite close to the original $v_i'$ because only a small portion of pixel intensities are affected. This treatment should not degrade the picture quality since it only brings the final image to be closer to the original, and most likely such substitution takes place at uniform regions. The detection of the watermark should also remain robust since the majority of the pixels are not altered and may be used for watermark decoding.

Furthermore, some experiments have been performed for the watermark-estimation attack. It was found that the estimate of $v_{di}$ had a large error even when there was only rounding noise in the watermark image. A routine of singular value decomposition was adopted to avoid the numerical problem caused by a singular matrix in solving equation (23). Therefore, the watermark-estimation attack seems to be less damaging.

Figure 1:
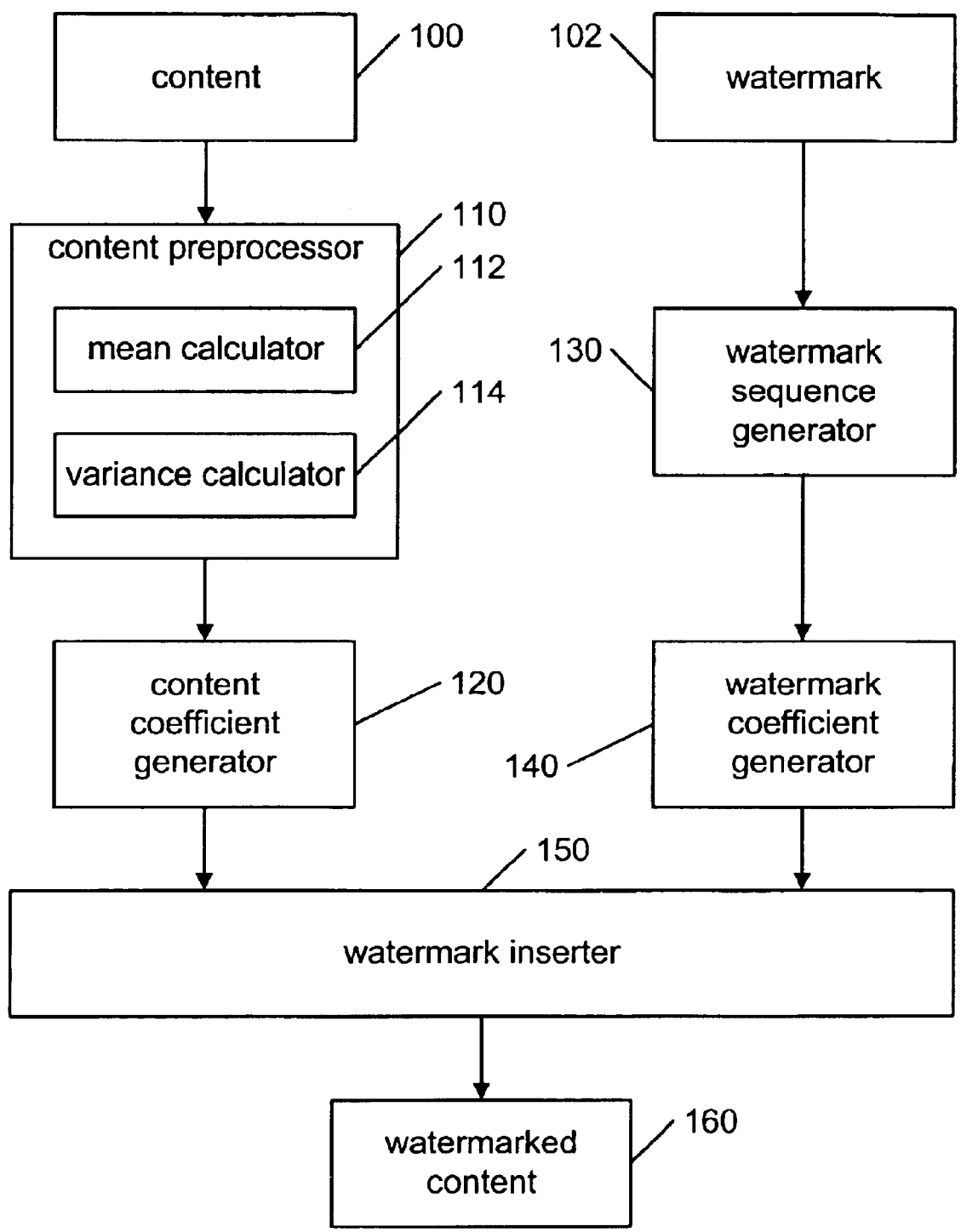
FIG. 1 is a block diagram of a watermark insertion device as per an embodiment of the present invention.
Figure 2:
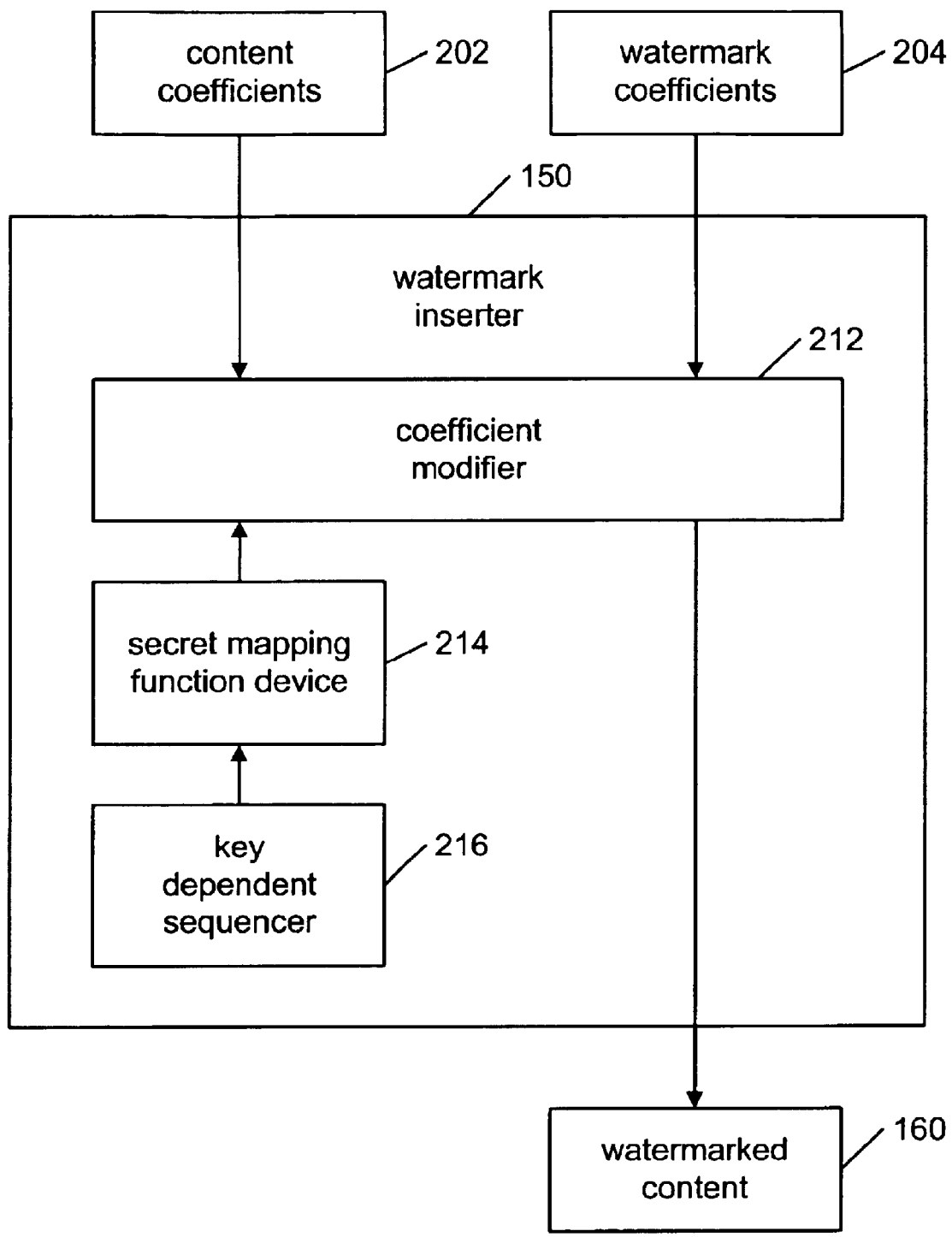
FIG. 2 is a block diagram of a watermark inserter as per an embodiment of the present invention.

We will now start to describe some embodiments of the present invention by referring to FIGS. 1 and 2. FIG. 1 is a block diagram of a watermark insertion device as per an embodiment of the present invention. FIG. 2 is a block diagram of a watermark inserter 150 as per an embodiment of the present invention. Content 100 may be input to a content preprocessor 110. The content may be still any type of information including images, video, and music. The content preprocessor 110 preferably normalizes the image and may include a mean calculator 112 and variance calculator 114 for calculating the mean and variance values of the content 100. After being preprocessed by the content preprocessor 110, a content coefficient generator 120 may generate content coefficients. These coefficients may be coefficients for any type of function that may be used to describe the content, such as DCT coefficients. A watermark 102 may be converted into a watermark sequence by a watermark sequence generator 130. The watermark sequence may then be input to a watermark coefficient generator 140 which may generate coefficients that may be compatible with the content coefficients. A watermark inserter 150 accepts as input both the content coefficients 202 and the watermark coefficients 204, and modifies them using a coefficient modifier 212. A key dependent sequencer 216 outputs a sequence to a secret mapping function device 214. The output of the secret mapping function device 214 may be used by the coefficient modifier 212 in generating watermarked content 160 by adjusting the amplitude of the watermark coefficients 204 so that the distortion between the content coefficients 202 and the watermark coefficients 204 may be minimized.

Figure 3:
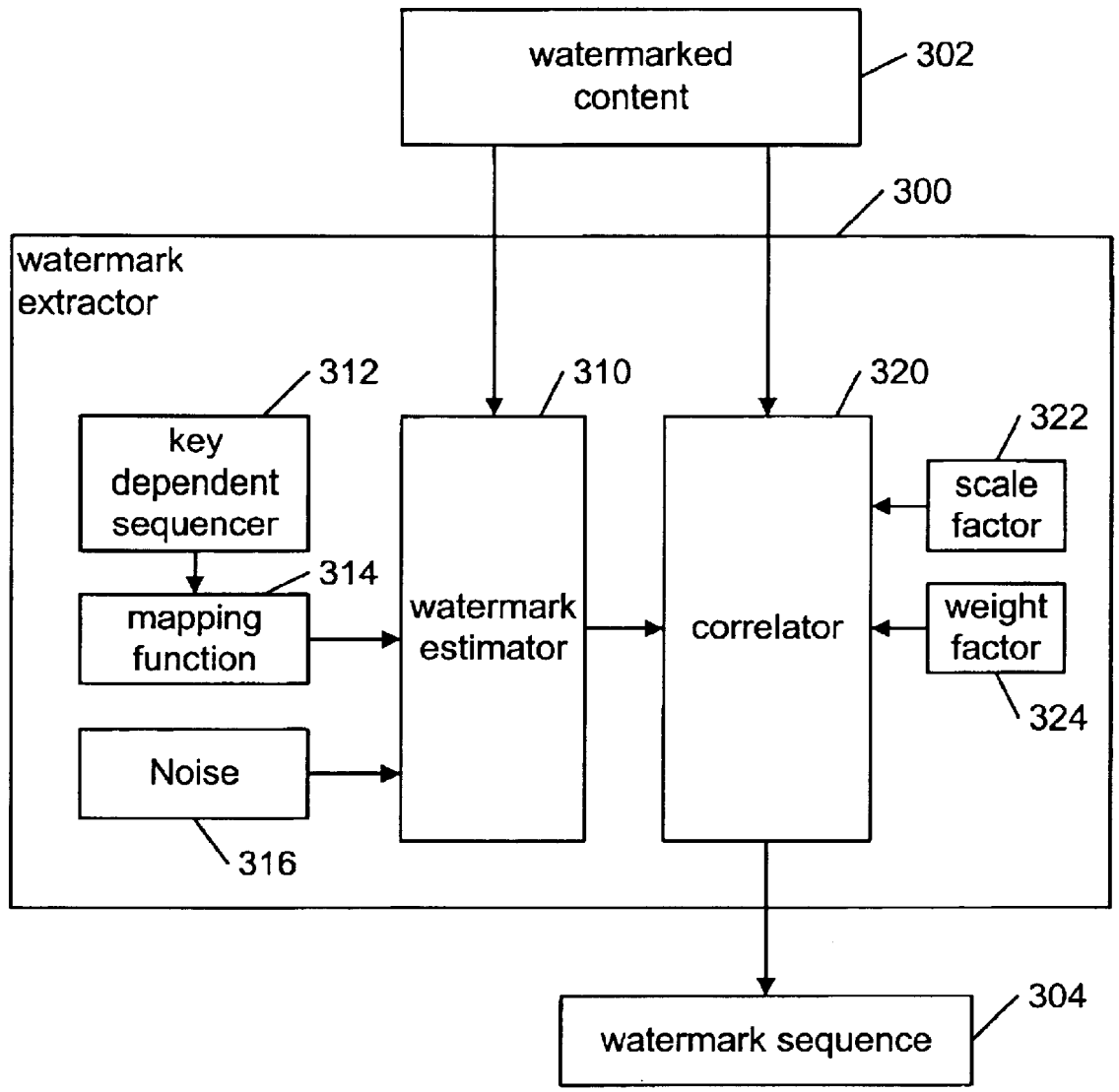
FIG. 3 is a block diagram of a watermark extractor as per an embodiment of the present invention.

FIG. 3 is a block diagram of a watermark extractor as per an embodiment of the present invention. The watermark extractor 300 preferably accepts as input watermarked content 302 and outputs a watermark sequence 304. Watermark estimator 310 estimates a watermark from the watermarked content 302, a mapping function 314, and noise 316. The mapping function 314 uses input from a key dependent sequencer 312 in generating its sequence. A correlator may accept as input the watermarked content 302, a scale factor 322 and a weight factor 324 and uses a correlation function to generate the watermark sequence 304.

Figure 4:
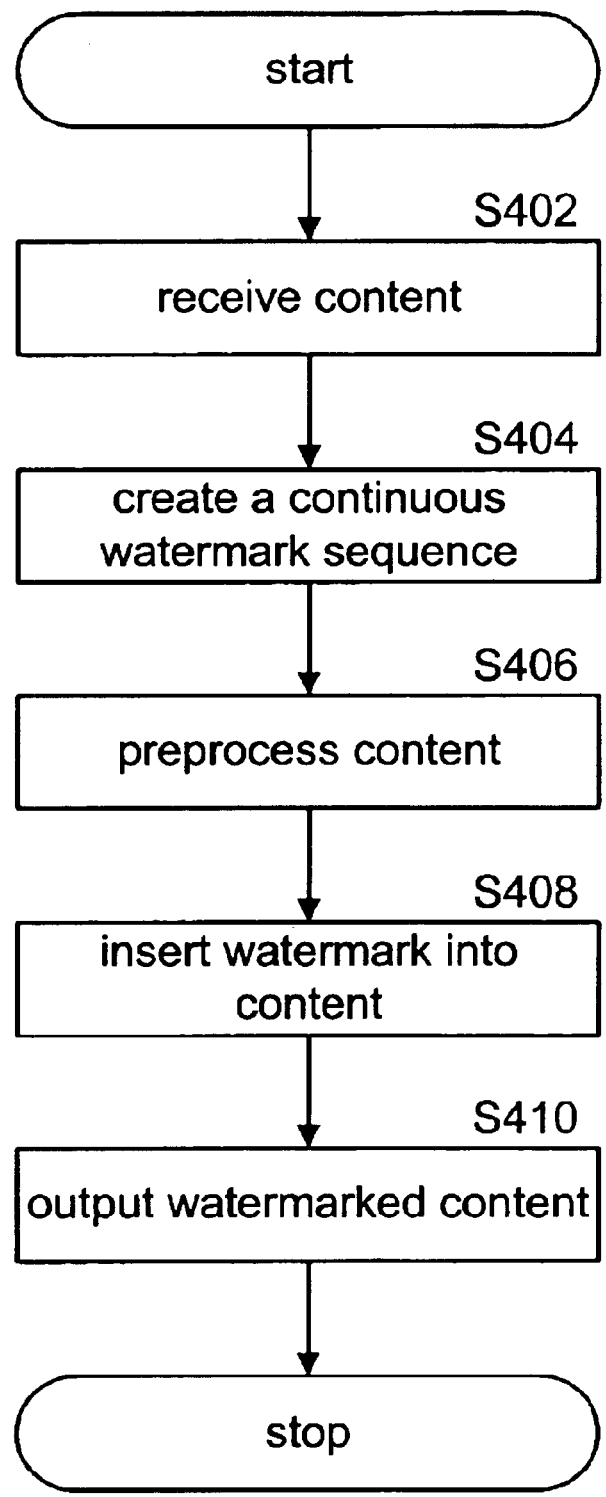
FIG. 4 is a flow diagram showing how a watermark may be inserted into content as per an embodiment of the present invention.

FIG. 4 is a flow diagram showing how a watermark may be inserted into content as per an embodiment of the present invention. First the content may be received for processing at step S404. A continuous watermark sequence may be generated at step S404. Step S406 preprocesses the content. The preprocessing may normalize the content and may include mean and variance calculations. At step S408, the watermark is inserted into the content. Finally, at step S410 the watermarked content is output.

Figure 5:
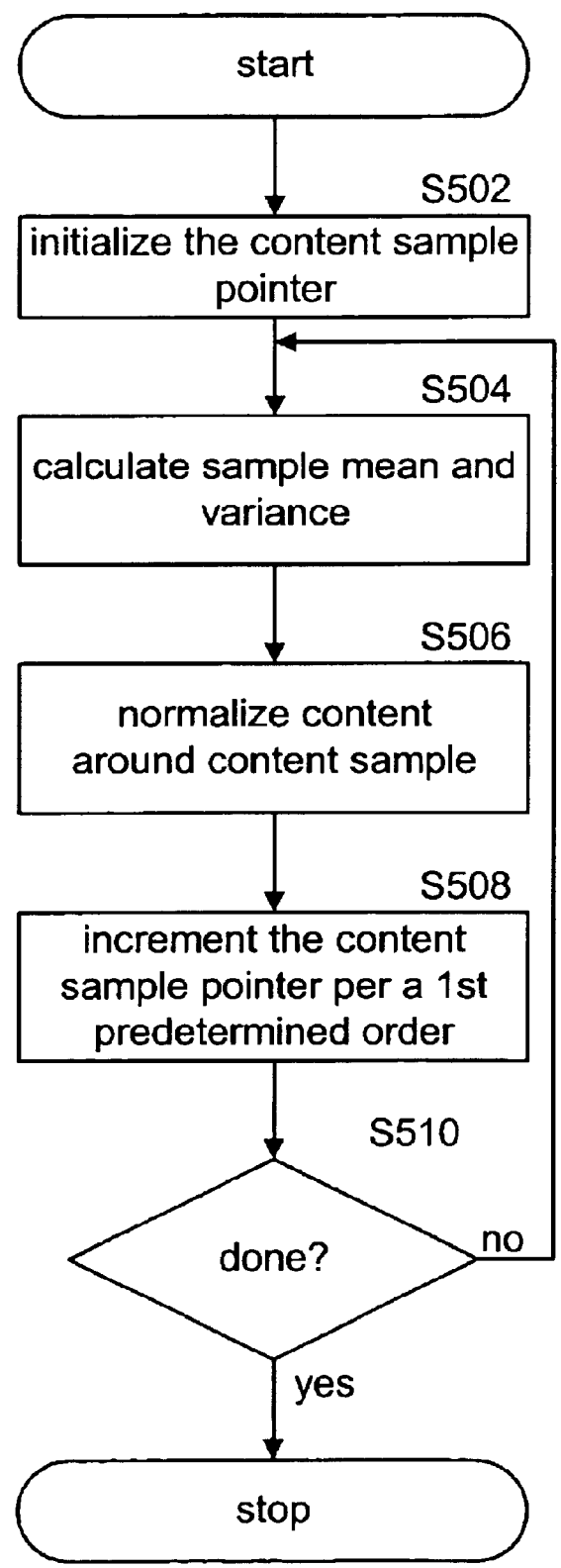
FIG. 5 is a flow diagram showing how a content may be preprocessed as per an embodiment of the present invention.

FIG. 5 is a flow diagram showing how a content may be preprocessed as per an embodiment of the present invention. This diagram is an expansion of step S406. A content sample pointer is initialized at step S502. A sample mean and variance may be calculated at step S504. The content may then be normalized around the content sample at step S506, after which the sample pointer may be incremented per a first predefined order. The order may be any number of orders such as those shown in FIGS. 9A, 9B, 9C, and 9D. Next, a determination is made at step S510 if the process is complete. If the determination is positive, the process stops, otherwise the processing continues at step S504.

Figure 6:
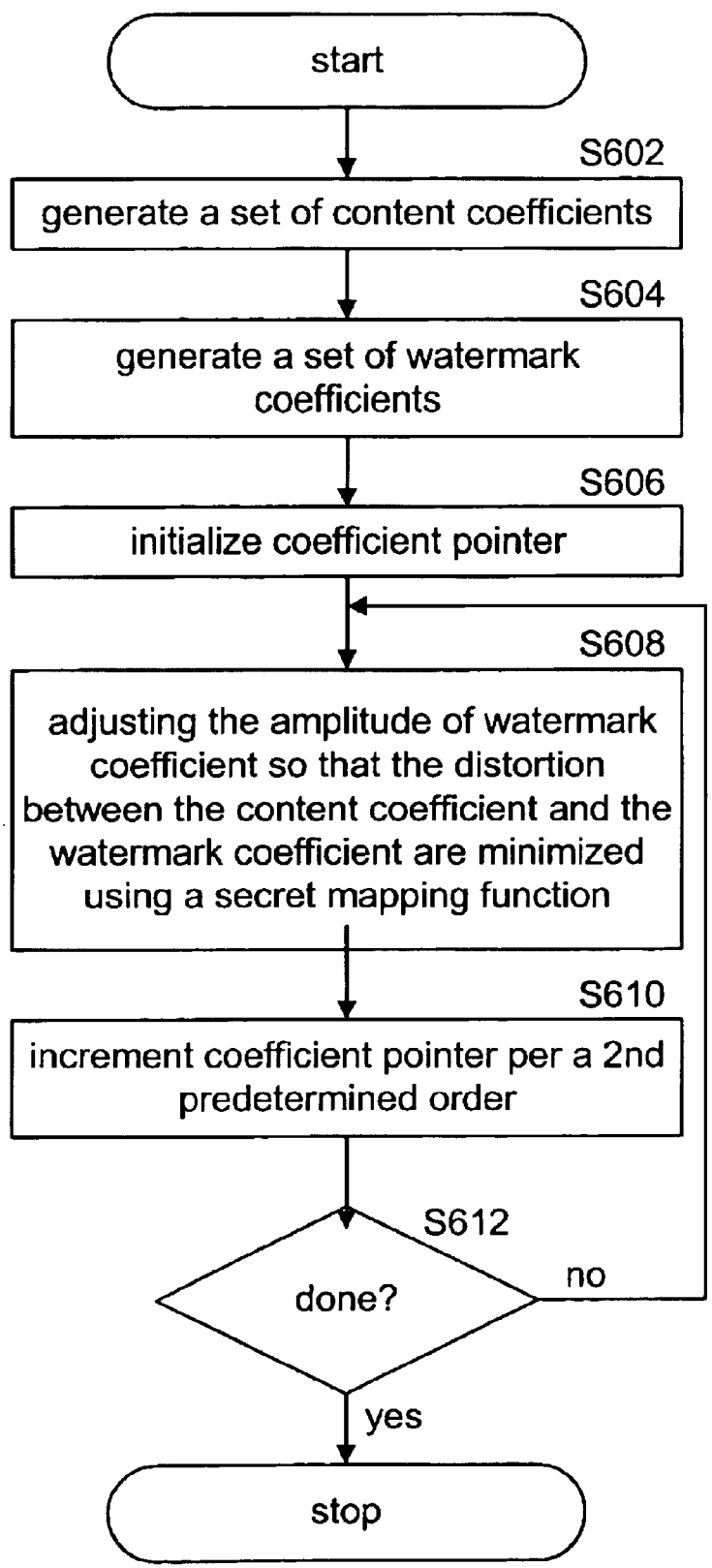
FIG. 6 is a flow diagram showing watermark content being embedded into content data as per an embodiment of the present invention.

FIG. 6 is a flow diagram showing watermark content being embedded into content data as per an embodiment of the present invention. This diagram is an expansion of block S408. Content coefficients may be generated at step S602 and watermark coefficients may be generated at step S604. A coefficient pointer may be initialized at step S606. At step S608, the amplitude of a watermark coefficient being pointed to by the coefficient pointer may be adjusted so that the distortion between the watermark coefficient and its associated content coefficient are minimized using a secret mapping function. Next, a determination may be made at step S610 if the process is complete. If the determination is positive, the process stops, otherwise the processing continues at step S608.

Figure 7:
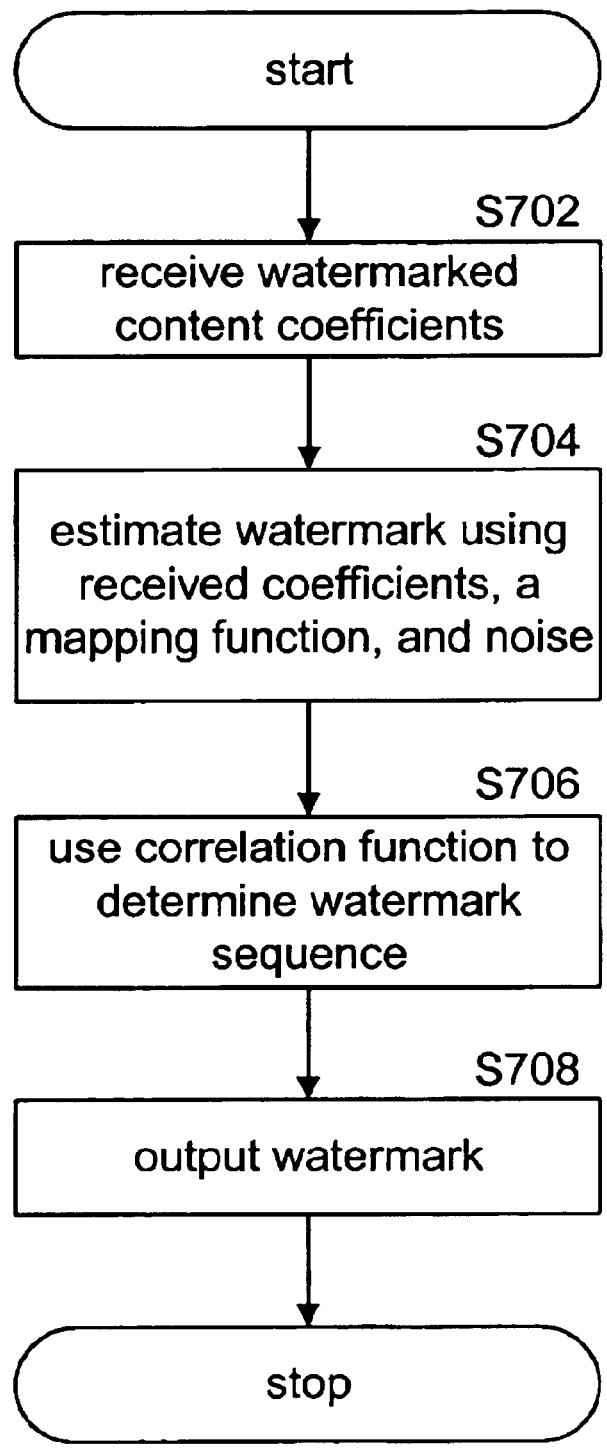
FIG. 7 is a flow diagram showing how a watermark may be extracted from watermarked content as per an embodiment of the present invention.

FIG. 7 is a flow diagram showing how a watermark may be extracted from watermarked content as per an embodiment of the present invention. Watermarked content coefficients may be received at step S702. An estimated watermark using the received coefficients, a mapping function, and noise may be generated at step S704. Next, a correlation function may be used to determine the watermark sequence at step S706. The correlation function may use a scale factor a weighting factor, the watermarked content, and the watermark estimation in determining the watermark sequence. The watermark sequence may be output at step S708.

A simple but effective way to protect the watermarks for oblivious watermarking by using a new class of mapping functions has been disclosed. These functions may be controlled by key-dependent random sequences. The watermark encoding and decoding may only require a simple computation. A security problem of a binary mapping function may be overcome by using random quantization steps. The disclosed mapping functions may be applied to pixel-based approaches and other transform-based approaches including the key-dependent basis functions. The discussion on watermark-estimation attack indicates that this attack may be defeated easily. Thus, the use of key-dependent mapping functions may provide an alternative to build a secure and robust oblivious system instead of using the time-consuming key-dependent basis functions.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used with other types of content besides just images such as music, video, and data. It is intended that the scope of the invention be defined by the claims appended hereto.

We claim:

1. A method for embedding a watermark into content, said content containing content samples, comprising the steps of:
    (a) receiving said content;
    (b) creating a continuous watermark sequence from said watermark;
    (c) for each content sample in a first predetermined order:
        (i) calculating a sample mean;
        (ii) calculating a sample variance; and
        (iii) normalizing said content;
    (d) generating a set of content coefficients from said content;
    (e) generating a set of watermark coefficients from said watermark sequence;
    (f) embedding said watermark in said content by adjusting the amplitude of said watermark coefficients so that the distortion between the content coefficients and the associated watermark coefficients are minimized using a secret mapping function; and
    (g) outputting said content.

2. The method according to claim 1 wherein said step of embedding said watermark in said content is performed by adjusting the watermark coefficients sequentially in a second predetermined order.

3. The method according to claim 1 wherein said digital content is an image and said content sample is a pixel.

4. The method according to claim 1 wherein said secret mapping function has parameters, and said parameters are controlled by one or more key-dependent sequences.

5. The method according to claim 4 wherein said key-dependent sequences are key-dependent random sequences.

6. The method according to claim 4 wherein at least one of said key-dependent sequences are uniformly distributed.

7. The method according to claim 4 wherein at least one of said key-dependent sequences is continuous.

8. The method according to claim 4 wherein at least one of said key-dependent sequences is secret.

9. The method according to claim 1 wherein each watermark coefficient may have a different quantization step size.

10. The method according to claim 1 wherein said secret mapping function is a sawtoothed function.

11. The method according to claim 1 wherein said secret mapping function is a triangle mapping function.

12. The method according to claim 1 wherein said secret mapping function is a binary function using randomized quantization steps.

13. The method according to claim 1 wherein said secret mapping function is generated by a program.

14. The method according to claim 1 wherein said secret mapping function is continuous.

15. The method according to claim 1 wherein said secret mapping function is piecewise continuous.

16. The method according to claim 1 wherein said secret mapping function is a look-up table.

17. The method according to claim 1 wherein said secret mapping function is a pixel based function.

18. The method according to claim 1 wherein said first predetermined order is a r aster scan order.

19. The method according to claim 2 wherein said second predetermined order is a zig-zag order.

20. A method for extracting a watermark sequence from watermarked content comprising the steps of:
    (a) receiving watermarked content comprising received coefficients;

(b) generating an estimated watermark determined by received coefficients, and a mapping function;

(c) generating a watermark sequence using a correlation function, said correlation function using the watermarked content, the estimated watermark, a scaling factor, and a weight ing factor per a predetermined equation; and (d) outputting the watermark sequence.

21. An apparatus for extracting a watermark sequence from watermarked content comprising:

(a) a noise source;

(b) a key dependent sequencer;

(c) a mapping function having parameters, at least one of said parameters receiving input from said key dependent sequencer;

(d) a watermark estimator, said watermark estimator generating a watermark estimate from the watermarked content, and the mapping function (e) a scale factor;

(f) a weight factor; and (g) a correlator, said correlator generating the watermark sequence from the watermarked content, the scale factor, the weight factor and the water mark estimate.

22. A n apparatus for embedding a watermark data into content including:

(a) a content preprocessor, said content preprocessor further including:

(i) a mean calculator; and (ii) a variance calculator;

(b) a content coefficient generator for generating content coefficients from the preprocessed content;

(c) a watermark sequence generator for generating a watermark sequence from the watermark data;

(d) a watermark coefficient generator for generating watermark coefficients from the watermark sequence; and (e) a watermark inserter for generating watermarked content.

23. An apparatus according to claim 22, wherein said watermark inserter further includes:

(a) a key dependent sequencer, (b) a secret mapping function device, said secret mapping function device receiving input from said key dependent sequencer; and (c) a coefficient modifier for generating watermarked content by adjusting the amplitude of the watermark coefficients so that the distortion between the content coefficients and the associated watermark coefficients are minimized using the secret mapping function device.

* * * * *